US010772183B2

(12) United States Patent
Wu et al.

(10) Patent No.: US 10,772,183 B2
(45) Date of Patent: Sep. 8, 2020

(54) DISABLING PLASMA ARC TORCHES AND RELATED SYSTEMS AND METHODS

(71) Applicant: Hypertherm, Inc., Hanover, NH (US)

(72) Inventors: Jing Wu, Etna, NH (US); Bruce P. Altobelli, Grantham, NH (US); Zheng Duan, Hanover, NH (US); Dennis M. Borowy, Hanover, NH (US); Junsong Mao, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 349 days.

(21) Appl. No.: 15/870,001

(22) Filed: Jan. 12, 2018

(65) Prior Publication Data

US 2018/0206322 A1 Jul. 19, 2018

Related U.S. Application Data

(60) Provisional application No. 62/446,058, filed on Jan. 13, 2017.

(51) Int. Cl.
| | |
|---|---|
| *H05H 1/34* | (2006.01) |
| *H05H 1/36* | (2006.01) |
| *B23K 10/00* | (2006.01) |
| *B23K 9/10* | (2006.01) |

(52) U.S. Cl.
CPC ............ *H05H 1/36* (2013.01); *B23K 9/10* (2013.01); *B23K 10/006* (2013.01); *H05H 1/34* (2013.01); *H05H 2001/3415* (2013.01); *H05H 2001/3473* (2013.01)

(58) Field of Classification Search
CPC .......... H05H 1/34; H05H 1/36; H05H 1/3405; H05H 2001/3415; H05H 2001/3473; H05H 1/26; H05H 2001/3489; B23K 10/006; B23K 9/10; B23K 10/00; B23K 10/02; H01H 9/20; H01H 9/26; H01H 9/226; H01H 9/28; H01H 9/285

See application file for complete search history.

(56) References Cited

U.S. PATENT DOCUMENTS

| | | | |
|---|---|---|---|
| 4,896,016 A | 1/1990 | Broberg et al. | |
| 5,039,837 A | 8/1991 | Nourbakhsh et al. | |
| 5,074,802 A | 12/1991 | Gratziani et al. | |
| 5,597,497 A | 1/1997 | Dean et al. | |
| 5,796,067 A * | 8/1998 | Enyedy | B23K 10/00 219/121.52 |
| 6,096,993 A | 8/2000 | Marhic et al. | |
| 6,700,091 B2 | 3/2004 | Jones et al. | |

(Continued)

*Primary Examiner* — David J Walczak
(74) *Attorney, Agent, or Firm* — Proskauer Rose LLP (57) ABSTRACT

In some aspects, methods of disengaging a plasma control circuit within a plasma arc torch of a plasma processing system to place the torch into a safety-locked mode can include providing: a plasma control circuit configured to convey a current from the plasma cutting system through the plasma arc torch to one or more consumables disposed in the torch and an operator interface switch connected to the plasma control circuit and configured to initiate generation of a plasma arc from the plasma arc torch; and activating a switch, separate from the operator interface switch, disposed on the torch and connected to the plasma control circuit to disconnect the plasma control circuit to limit the current, including pilot current, from flowing to the one or more consumables.

23 Claims, 5 Drawing Sheets

(56) References Cited

U.S. PATENT DOCUMENTS

| | | | |
|---|---|---|---|
| 6,979,799 B2 * | 12/2005 | Centner | ............... B23K 9/10 200/321 |
| 7,087,856 B2 * | 8/2006 | Eldridge | ............. B23K 9/0956 219/121.54 |
| 7,762,830 B2 | 7/2010 | Roberts | |
| 2004/0020908 A1 | 2/2004 | Centner | |

* cited by examiner

DISABLING PLASMA ARC TORCHES AND RELATED SYSTEMS AND METHODS

RELATED APPLICATIONS

This application claims the benefit of U.S. Provisional Patent Application Ser. No. 62/446,058 filed Jan. 13, 2017, entitled "Torch Lock for a Plasma Arc Cutting System," the contents of which are hereby incorporated herein by reference in their entirety.

TECHNICAL FIELD

This application relates generally to plasma arc torches, and more specifically to disabling plasma arc torches to plasma arc systems and to related systems and methods.

BACKGROUND

Plasma arc torches are widely used in the cutting or marking of metal workpieces. A plasma arc torch generally includes a torch body, an electrode mounted within the body, a nozzle with a central exit orifice, electrical connections, passages for cooling and arc control fluids, a swirl ring to control the fluid flow patterns, a power supply and a means to control the operation of the torch.

A plasma arc torch generates a constricted ionized jet of plasma gas with high temperature and high momentum. The plasma jet typically exits the nozzle orifice of the torch typically at a temperature of between 15,000-50,000 degrees centigrade at a typical velocity of up to 7,000 m/s. A plasma jet with these temperatures and velocities produces extreme rates of heat transfer which are necessary to cut rapidly through metals. Such extreme rates of heat transfer can result in a serious hazard of traumatic burns to the operator and other workers in close proximity to the jet exiting the plasma arc torch. The operating instructions for commercial plasma arc torches usually instruct the operator to disable the power supply before disassembling the torch for service or when leaving the plasma arc torch unattended and warn the operator of possible injuries (e.g., electric shock) resulting from a failure to follow correct operating procedures. It is, however, frequently observed in practice that operators fail to follow the manufacturer's instructions and warnings.

Some plasma arc torches, such as handheld torches, can be trigger-activated devices. That is, the torch generates a plasma stream in response to operator activation of a trigger. Accidents can occur when the operator handles the torch in certain scenarios without turning off the power supply (e.g., changing consumables) or inadvertently activates the trigger controlling the plasma stream (e.g., to inadvertently fire the torch). Accidents can also occur with plasma arc torches when the operator places the torch body on a hard surface while attending to other tasks. In this event, the trigger can be inadvertently activated if objects like clothing or building materials are placed on top the torch. For example, in some cases, this can occur when a torch is placed in a user's pocket, such as while climbing or negotiating uneven terrain. Additionally, accidents can occur if a torch is dropped such that its trigger strikes a solid object.

Further, operators sometimes fail to disable the plasma arc torch power supply when changing consumable parts from the torch body. Replacement of consumable components often requires gripping the torch body, in the proximity of the control switch, while removing the torch cap to access consumable parts. Most plasma arc torches contain safety devices (e.g., cap sense switches that can detect presence or absence of certain consumables) so that, if the torch is disassembled, the power supply and thus the torch is deactivated. Unfortunately, these safety devices occasionally fail and sometimes indicate to the power supply that the cap is connected when it is not. In this event, if the operator removes the cap to exchange consumable parts and inadvertently compresses the trigger, the operator can be severely burned if and when the cap sense switch fails to prevent the torch from firing.

SUMMARY

In some aspects, plasma arc torches for plasma cutting systems can include: a torch grip; an operator interface switch connected to a plasma control circuit: i) configured to control a current from the plasma cutting system through the plasma arc torch to one or more consumables disposed at a distal end of the torch grip and ii) configured to initiate generation of a plasma arc from a tip of the torch; a cap sense switch disposed within the torch grip connected to the plasma control circuit and configured to detect a presence of one or more of the consumables, the cap sense switch further configured to open or close the plasma control circuit in accordance with the detection of the presence of the one or more consumables; and a torch disable switch separate from the operator interface switch disposed on the torch grip and connected to the plasma control circuit, the torch disable switch including: a plasma control circuit disconnect configured to selectively connect or disconnect the plasma control circuit to prevent current flow, including pilot current, to the one or more consumables, and a user interface connected to the plasma control circuit disconnect, the user interface configured to operatively connect or disconnect the plasma control circuit with the plasma control circuit disconnect in response to an operator input.

Embodiments can include one or more of the following features.

The plasma control circuit disconnect can be further configured to selectively connect or disconnect a bypass circuit to bypass the cap sense switch. The plasma control circuit disconnect can be configured to: i) selectively disconnect the plasma control circuit, and ii) selectively connect a bypass circuit to bypass the cap sense switch based on a single operator input. The plasma control circuit disconnect can be configured to: i) selectively disconnect the plasma control circuit, and ii) selectively connect the bypass circuit to bypass the cap sense switch substantially simultaneously.

The torch disable switch can include a spring clip mechanism. The plasma arc torch can be an air-cooled plasma cutting system. The user interface can include a slide mechanism having a first position and a second position. The first position and the second position can be color coded indicators. The torch disable switch can mechanically disconnect the plasma control circuit. The user interface can be configured to be moved in an axial direction substantially parallel to a longitudinal axis of the torch grip.

The operator interface switch can be disposed remote from the torch. The operator interface switch can be configured to be moved for engagement in a direction that is substantially a perpendicular direction to the user interface. The plasma arc torch can further include a printed circuit board disposed within the torch grip beneath, or integrated within, the torch disable switch.

In some aspects, safety circuits for plasma arc torches of plasma cutting systems to regulate a supply of plasma current can include: a plasma start circuit connected to provide a current from the plasma cutting system through the plasma arc torch to one or more consumables disposed in the plasma arc torch; a switching means connected to the plasma control circuit and configured to generate a plasma arc from a tip of the torch; a cap sense switch circuit configured to detect a presence of one or more of the consumables in the plasma arc torch, the cap sense switch further configured to connect or disconnect the plasma start circuit in accordance with the detection of the presence of the one or more consumables; and a means, separate from the switching means, to open the plasma start circuit to limit current flow, including pilot current, to the one or more consumables.

Embodiments can include one or more of the following features.

The circuit can further include a cap sense bypass circuit configured to provide a current to the cap sense switch; and a means to close the cap sense bypass circuit. The means to open the plasma start circuit and the means to close the cap sense bypass circuit can include a common component.

In some aspects, methods of disengaging a plasma control circuit within a plasma arc torch of a plasma processing system to place the torch into a safety-locked mode can include: providing: a plasma control circuit configured to convey a current from the plasma cutting system through the plasma arc torch to one or more consumables disposed in the torch grip; an operator interface switch connected to the plasma control circuit and configured to initiate generation of a plasma arc from the plasma arc torch; and a cap sense switch connected to the plasma control circuit and configured to: i) detect an installation of one or more of the consumables in the plasma arc torch, and ii) connect or disconnect the plasma control circuit in accordance with the detection of the installation of the one or more consumables; and activating a switch, separate from the operator interface switch, disposed on the torch grip and connected to the plasma control circuit to disconnect the plasma control circuit to limit the current, including pilot current, from flowing to the one or more consumables.

Embodiments can include one of more of the following features.

The activating a switch disposed on the torch grip can further bypasses the cap sense switch by closing a circuit in parallel to the cap sense switch. The methods can further include removing and replacing a consumable from the plasma arc torch. The methods can further include de-activating the switch to: connect the plasma control circuit and open the circuit to the cap sense switch to place the torch into a use mode; and activating a second switch to initiate a firing sequence to generate a plasma arc. The disconnecting the plasma control circuit and the bypassing the cap sense switch by closing the circuit in parallel to the cap sense switch can be achieved in a single user input and the plasma control circuit is disconnected before bypassing the cap sense switch. The disconnecting the plasma control circuit and the bypassing the cap sense switch by closing the circuit in parallel to the cap sense switch can be achieved in a single user input and the plasma control circuit is disconnected simultaneously with bypassing the cap sense switch.

Embodiments described herein can have one or more of the following advantages.

As discussed below, with some conventional systems, the user of a plasma cutting system can face a risk of potentially firing the torch accidently (which can lead to injury) or be required to reset the power supply to cycle the system after replacing consumables (which can lead to an inconvenience of frequent forced trips to a distant power supply). However, the systems and methods described herein can advantageously reduce these issues by providing mechanisms to allow the user to temporarily stop (e.g., prevent) the torch from firing, upon an action by the user at the torch, and consequently re-enable the torch for operation, upon a subsequent action by the user at the torch. That is, by limiting current flow to the consumables (e.g., including pilot current), the torch can be less likely to inadvertently fire when handling. Thus, as a result, in some cases, a user will be able to change consumables safely without the requirement of accessing the power supply, without compromising safety.

As discussed below, the systems and methods described herein can include one or more circuits, physical switch assemblies, or software/firmware programs that are configured to temporarily prevent current from flowing to the torch tip so that they can be handled and removed/replaced while, in some aspects, also bypassing a cap sense switch (e.g., a sensor circuit configured to determine and confirm that a consumable is installed in the torch), which permits the user to remove and replace the consumables without tripping the system and requiring a reset. That is, in some conventional systems, if the consumables are simply removed, the cap sensor switch will trip and the system will not be able to fire until reset.

For example, in conventional plasma arc torch consumable replacement sequences, when a user changes the consumables (e.g., from old/used to new), hand torch operations typically have been programmed to carry out the following sequence, and ask the user/operator to: 1) turn off the power supply at the physical power supply (e.g., by flipping a switch or switches on the power supply) to stop electricity from flowing to the torch; 2) change the consumables; and 3) turn on the power supply (e.g., by flipping a switch or switches on the power supply). In reality, users may ignore the shut-off power supply step either due to a lack-of-willingness or inconvenience (e.g., the power supply can be located far away or be difficult to access from the operation site). For example, the torch can routinely be located several meters away from the power supply. When this happens, the power supply will typically shut-off automatically once the consumable is loosened from the torch and a cap sensor switch is triggered. Once the cap sensor switch is triggered, the user typically won't be able to operate (e.g., fire) the torch unless he or she walks over to the power supply and manually recycles (turns-it-off and then turns-it-on) the power supply. Such required cycling away from the torch can be an issue in distant or hard-to-reach or access places, causing delays in work.

While this logic/design provides safety to the users by preventing them from accidently firing the torch while it does not have a full suite of consumables properly installed and they are handling the torch during the consumable changing, it can create significant inconvenience or delays for the users, causing them to leave their work location to manually recycle the power supply. This recycling requirement typically provides a signal to the power supply and tells it the torch is ready to fire.

Other conventional systems can adopt another approach, where the torch can be fired as soon as the cap sensor is satisfied. This provides the convenience to the user in that it does not require a manual recycle before permitting operation. However, such approaches can create a potential safety hazard and may also nevertheless lead to unintentional/accidental fires. Whereas, the systems and methods described herein, which in some aspects can include one or more circuits, physical switch assemblies, or software/firmware programs that are configured to temporarily prevent current from flowing to the consumables so that they can be handled and removed/replaced can be useful to protect the user from harm while the consumables are being replaced.

Further, in conventional systems, torches are typically designed and manufactured to be so small and compact for better or more convenient handling and operation that available space on the torch itself can be limited. That is, available space on a torch may be limited only to that occupied by existing switches and delivery systems, such that additional components, such as the torch disable switches described herein, cannot be arranged on the torch. Additionally, particularly in view of this premium for space, in some conventional systems, torches may not include additional components or switches at all, particularly those that can add to the complexity of the torch design and introduces one or more failure modes. Additionally, such additional components and switches would have typically been expected to reduce torch robustness and durability in the field. Whereas, the systems and methods described herein have been developed to take advantage of the minimal design space, providing a compact and effective safety solution with a torch disable switch.

DETAILED DESCRIPTION

The systems and methods described herein can be implemented to allow a user to more safely handle a plasma arc torch, for example, during consumable replacement, by using one or more switches to limit plasma current, including pilot current, from reaching the consumables. Additionally, in some aspects, the systems and methods described herein can include bypassing a cap sensor switch circuit so that consumables can be safely handled and replaced, and then the system can be used without requiring the user to cycle the power supply.

Figure 1:
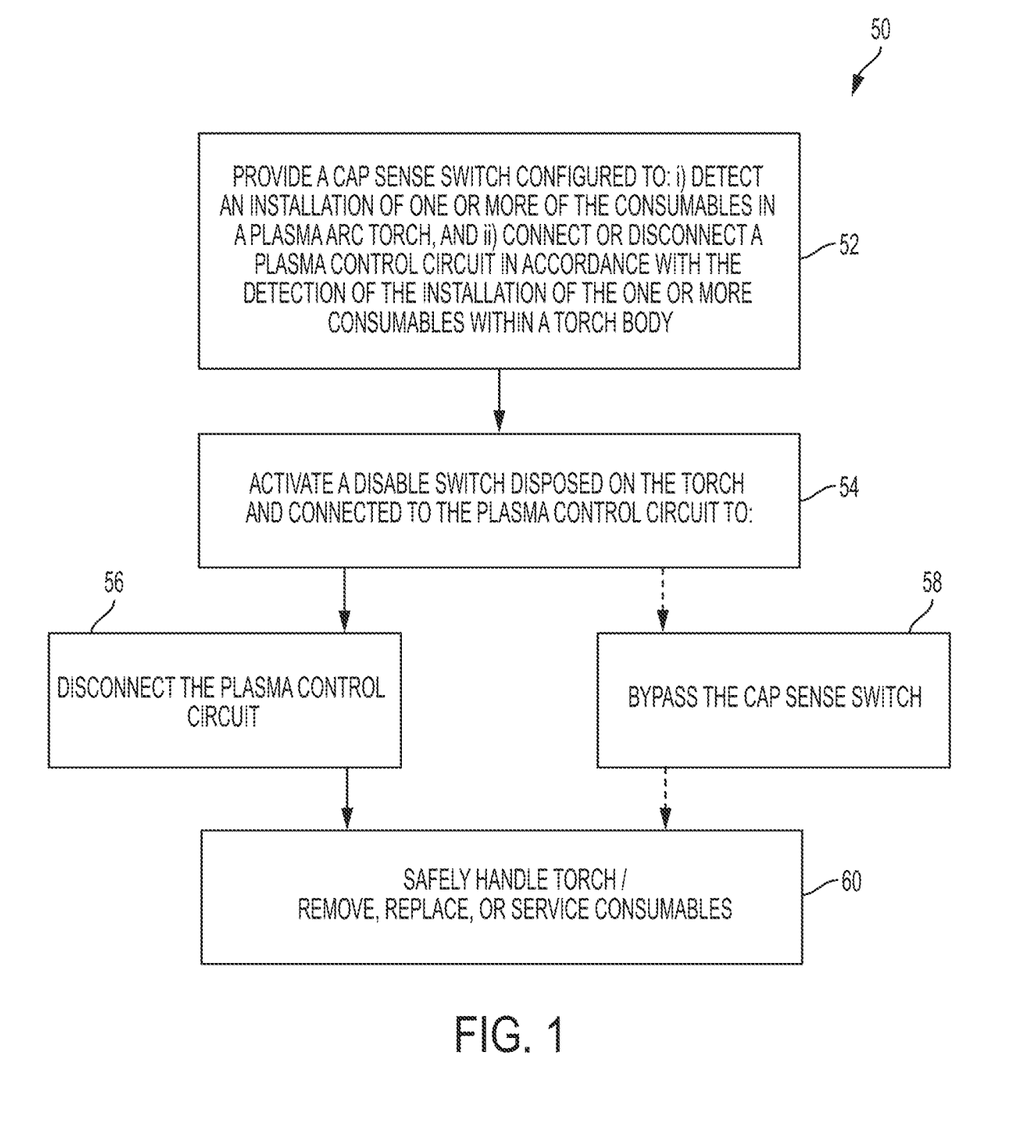
FIG. 1 is a diagram depicting an example method of disengaging a plasma control circuit within the plasma arc torch of a plasma processing system to place the torch into a safety-locked mode.

For example, referring to FIG. 1, in some embodiments, methods (50) of disengaging a plasma control circuit within the plasma arc torch of a plasma processing system to place the torch into a mode for handling or replacing consumables, such as a safety-locked mode can include providing: a plasma control circuit within a plasma arc torch, configured to convey a current from the plasma cutting system through the plasma arc torch to one or more consumables disposed in the torch body, and a cap sense switch connected to the plasma control circuit and configured to: i) detect an installation of one or more of the consumables in the plasma arc torch, and ii) connect or disconnect the plasma control circuit in accordance with the detection of the installation of the one or more consumables. (52)

The methods can, as detailed below, include sliding (e.g., activating) a switch disposed on the torch body and connected to the plasma control circuit. (54) For example, the switch can be configured to disconnect the plasma control circuit to limit current flow, including pilot current. (56) In some embodiments, the switch can control system electronics so that if the trigger (e.g., start button) is depressed, such as inadvertently pressed during handling, the system nonetheless does not initiate a plasma arc. Additionally or alternatively, in some embodiments, the switch can be configured to disconnect an electrical circuit directly providing current to the consumables or can create a physical blockage or mechanical disconnection of a second switch (e.g., the trigger). As discussed above, the switch can be used to disconnect or otherwise prevent current from flowing to the consumables so that the consumables can be safely handled for maintenance or replacement. (60)

In some embodiments, the switch can also be configured to bypass a cap sense switch. (58) As discussed herein, a cap sense switch is typically configured so that, once tripped (e.g., detecting that a consumable is not installed), the system will require a recycle (to restart the system) before permitting a user to fire the torch (e.g., to initiate a plasma arc) after consumables have been replaced. Thus, to avoid requiring a system restart after consumables are removed and replaced, the cap sense switch can be bypassed during consumable replacement, for example, by forming or closing a circuit (e.g., a cap sense bypass circuit) in parallel to the cap sense switch. (58) In some embodiments a processing system can be configured to detect a shutdown caused by cap sense switch due to a consumable being removed from the torch and can indicate to the user a proper, or more desirable shutdown sequence, including first disabling the torch using the torch disable switch described below.

In some embodiments, the plasma control circuit can be disconnected and the cap sense switch can be bypassed to close the circuit in parallel to the cap sense switch in a single user input. For example, in some embodiments, a single switch can be used to disconnect the plasma control circuit and close the circuit to bypass the cap sense switch. In some cases, the single input can include sliding the switch. In some embodiments, each of these connections or disconnections can be achieved using different switches.

In cases where the cap sense switch is bypassed, the disconnection of the plasma control circuit and the connection of the bypass circuit can occur in any of a variety of different timing sequences. In some embodiments, activating the switch disconnects the plasma control circuit before bypassing the cap sense switch. In some cases, the two can happen substantially simultaneously.

After the torch has been serviced (e.g., the consumables have been replaced), the methods can include sliding (e.g., de-activating) the switch to re-connect the plasma control circuit to place the torch into a use mode. In some cases, sliding the switch can also open or disconnect the circuit in parallel to the cap sense switch to place the torch into a use mode. For example, disconnecting the cap sense bypass circuit can re-establish the safety and security of a proper cap sense circuit. Additionally, reconnecting the plasma control circuit can re-enable the torch for use. Once the torch is ready for use, the second switch (e.g., trigger) can be activated to initiate a firing sequence to generate a plasma arc.

Any of various systems, such as mechanical, electrical, software, or firmware systems, can be implemented in order to carry out the methods described herein.

For example, referring generally to FIGS. 2-6, in some embodiments, mechanical and electrical systems implemented to carry out the methods described herein can include a plasma arc torch (e.g., a handheld plasma arc torch) 100 having a torch grip (e.g., torch handle)) 102, a torch body (to house or position a set of consumables) 104 at a distal end of the torch handle 102 configured to generate a plasma arc, a gas delivery line 106 to provide processing gas to the torch body 104, an operator interface switch (e.g., trigger) 108 to be used to initiate a firing sequence, and a torch disable switch 112 disposed on the torch handle 102.

In some cases, the plasma arc torch 100 can be an air-cooled torch (e.g., a handheld torch). In some cases, as discussed below with respect to FIG. 6, the plasma arc torch can be a liquid-cooled, mechanized torch. In some embodiments, the operator interface switch can be remote from the torch, such as within a controller for a mechanized torch. That is, mechanized torches may not include a trigger switch on them.

The torch 100 also includes a plasma control circuit configured to control a current (including a cutting current or a pilot arc current) from the plasma cutting system to which the torch is attached and through the plasma arc torch to the torch body 104. In some embodiments, the plasma control circuit is controlled by the trigger 108 such that when the trigger is properly depressed, and other system requirements described herein are met, the plasma control circuit can initiate a plasma arc. In some cases, the systems and methods described herein can temporarily limit a flow of all current, including a pilot arc current, to the consumables so that the torch can be safely handled even if the trigger 108 is pressed. In some cases, the plasma control circuit can be disposed or housed in the torch itself or in the power supply to which the torch is connected.

In some embodiments, the torch 100 includes a cap sense switch (e.g., cap sense sensor) 110 disposed within the torch handle connected to the plasma control circuit and configured to detect a presence of one or more of the consumables in the torch body 104. As discussed herein, the cap sense switch 110 is typically configured to open or close the plasma control circuit in accordance with the detection of the presence of the one or more consumables. That is, when the cap sense switch 110 does not detect that a substantially complete set of consumables are installed in the torch 100, it can prevent the plasma control circuit from initiating a plasma arc.

The torch 100 includes a torch disable switch 112 disposed on the torch handle 102 and connected to (e.g., in electrical communication with) the plasma control circuit. As discussed herein, the torch disable switch 112 can serve several functions. For example, the torch disable switch 112 can interface with a plasma control circuit configured to selectively connect or disconnect the plasma control circuit. That is, independent of the trigger 108, the torch disable switch 112 can prevent the torch from firing, even if the trigger 108 is depressed. The torch disable switch 112 is typically separate (e.g., distinct, physically separated from, formed as two separate components, located at or along different portions of the torch) from the trigger 108. In some embodiments, the separated torch disable switch 112 and trigger 108 can be formed as a common or integrated component with the two subcomponents disposed near one another or at separate regions of the torch.

In some embodiments, the torch disable switch 112 can include a user interface (e.g., a physical interface) 113 connected (e.g., mechanically or electrically connected) to the plasma control circuit disconnect to operatively connect or disconnect the plasma control circuit with the plasma control circuit disconnect in response to an operator input (e.g., sliding a switch). For example, in some embodiments, the torch disable switch 112 can include a physical switch 113 that can be manually activated by the user.

Figure 2:
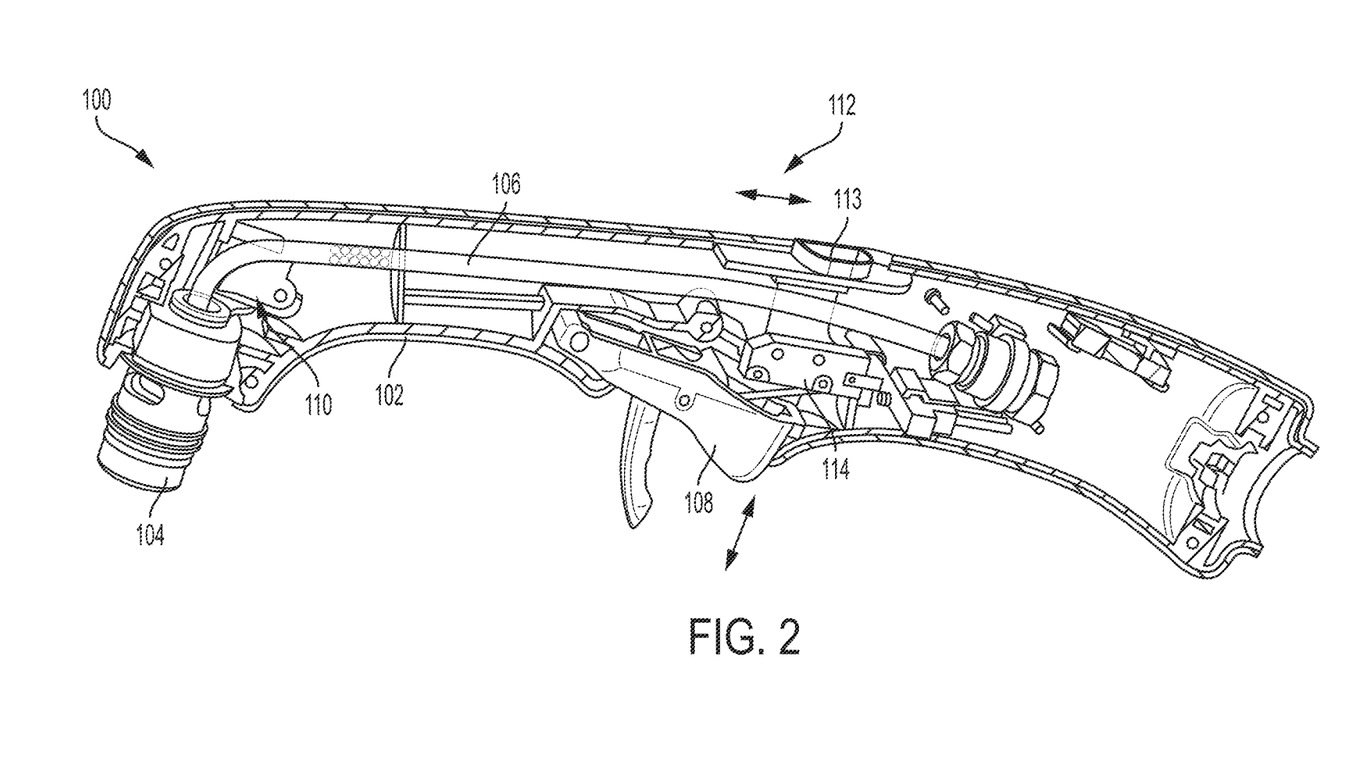
FIG. 2 is a side partially sectioned view of an example plasma arc torch illustrating an example mechanical lock switch (e.g., a torch disable switch) to disable a plasma control circuit to prevent the torch from producing a plasma arc.

The torch disable switch 112 can include various mechanical or electronic locking or switching mechanisms to prevent connection of the plasma control circuit and current to the torch body 104. For example, as depicted in FIG. 2, in some embodiments, the torch disable switch 112 can be a mechanical device configured so that when it is moved (e.g., slid, activated, disarmed), it can physically move a switching mechanism 114 of the trigger 108 so that even if the trigger is depressed, the switching mechanism 114 is not contacted to connect the plasma control circuit. For example, the switching mechanism 114 of the trigger 108 can be physically coupled to, and movable with, torch disable switch 112.

Other, electrical implementations of the torch disable switch 112 are possible. For example, in some embodiments, as depicted in FIGS. 3-6, the torch disable switch 112, which is substantially disconnected from (e.g., physically separated from and not mechanically interacting with) the trigger 108, that is electrically connected to the plasma control circuit and configured to open the plasma control circuit to limit current flow to the torch body 104 and consumables disposed therein. For example, the torch disable switch 112 can be an electrical switch.

Figure 4:
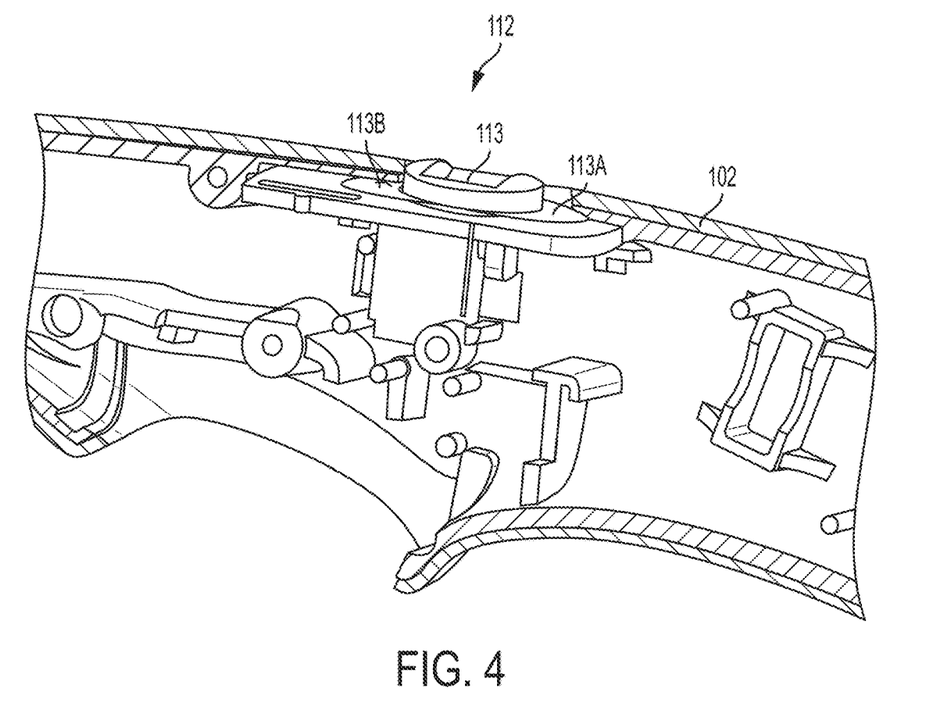
FIG. 4 is a perspective sectioned view of an example plasma arc torch illustrating an example electric torch disable switch to prevent the torch from producing a plasma arc.

In some cases, as depicted in the example of FIG. 4, the torch disable switch 112 can include a mechanically activated single purpose electrical switch (e.g., a toggle switch or slide switch). In some embodiments, the torch disable switch 112 can be in communication (e.g., wired or wireless communication) with a system controller and the plasma control circuit so that when the switch is moved, the plasma control circuit is electrically disconnected. For example, operating the torch disable switch 112 can open or close an electronic circuit providing current to the torch body 104 and consumables.

Figure 5:
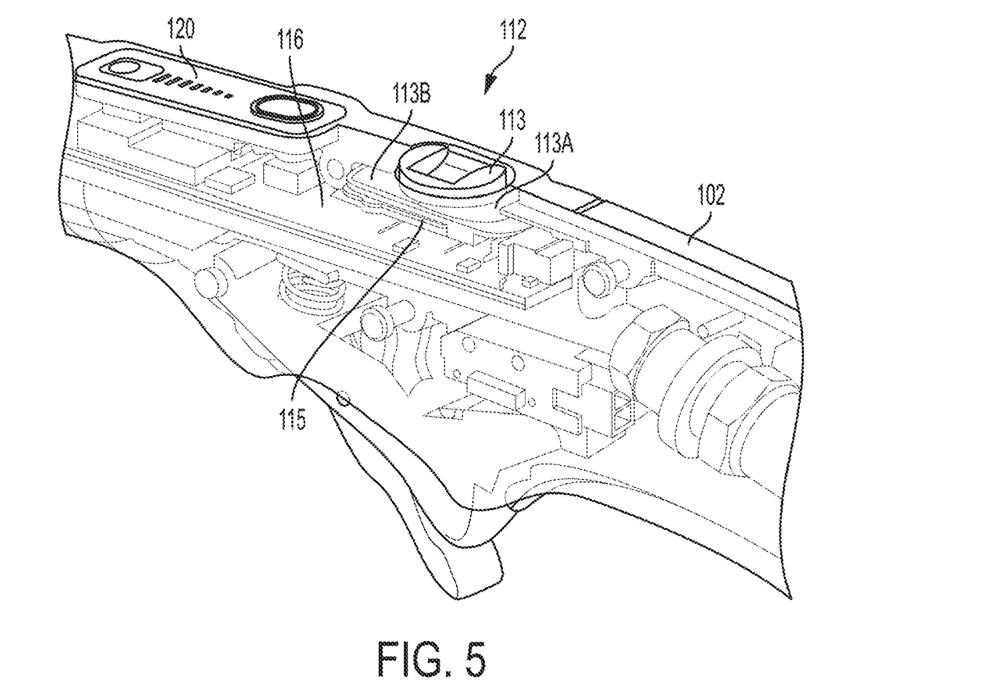
FIG. 5 is a perspective sectioned view of another example plasma arc torch illustrating a torch disable switch being formed with a printed circuit board and having a spring clip mechanism.
Figure 6:
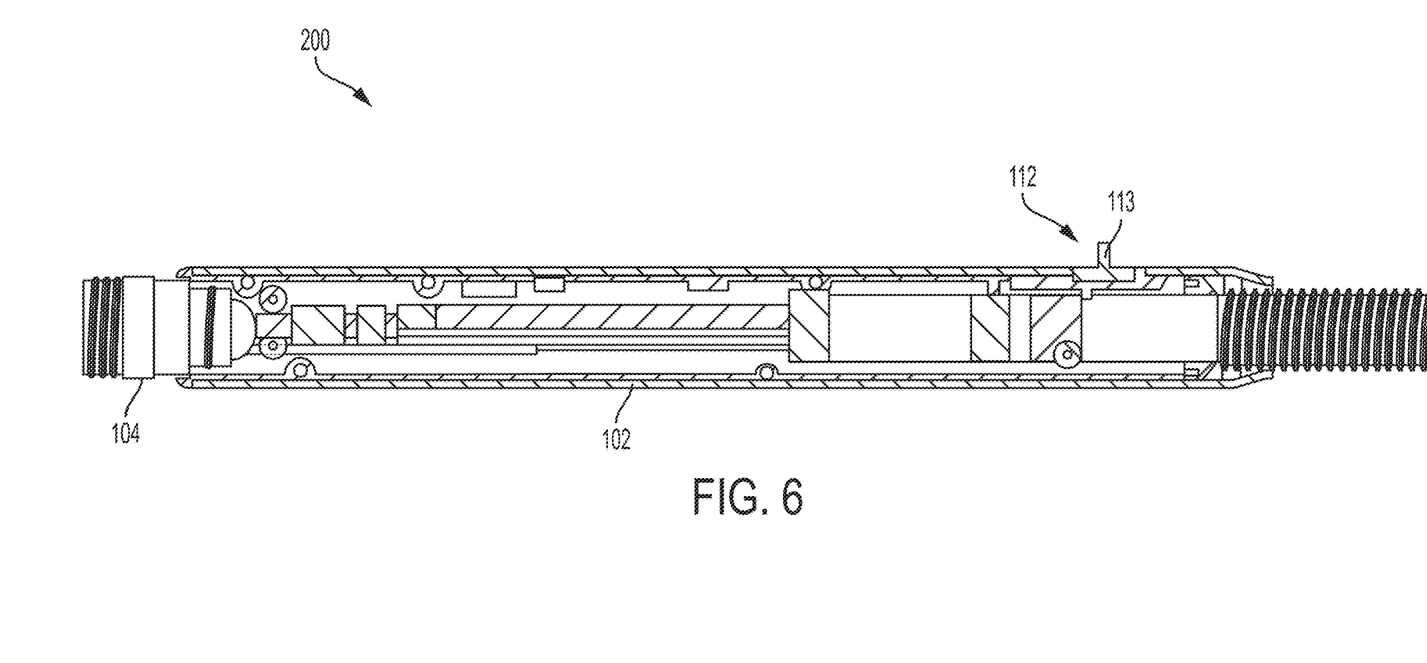
FIG. 6 is a side sectioned view of an example mechanized torch having a torch disable switch to prevent the torch from producing a plasma arc.

In some embodiments, as depicted in FIG. 5, the torch disable switch 112 can be disposed on, or otherwise include, a printed circuit board 116 disposed within the torch handle. That is, the torch disable switch 112 can be an electronic switch integrated with a circuit board. In some embodiments, the torch disable switch can include a standalone switch device connected to other circuitry with wired connections.

In some cases, the circuit board 116 can interface with one or more other electronic components or systems to operate or control other torch systems. For example, the circuit board 116 can be used for, or implemented with other torch control systems that can make it easier for the user to, control and monitor the plasma torch power supply at the torch itself (i.e., rather than back at the power supply/controller). In some embodiments, the circuit board and integrated systems can permit the user to not only control the torch disable switch at the torch but also to adjust and monitor/observe (e.g., visually see) settings of the plasma process such as amperage, gas flow, mode, etc. A control display 120 on top of the circuit board (and exposed for use) can include visual indicators (e.g., LEDs). Typically, the control display 120 includes at least one button, which can be separate from the torch disable switch, which can be used to adjust current level and/or torch mode. In some aspects, all of these added functions can be incorporated into one board for better use of space, ease of manufacturing, cost, etc., while the control interface can still be compact and all in one place.

The user interface 113 can be a slide mechanism (e.g., a sliding switch) having a first position and a second position. In some examples, the user interface 113 can be configured to be moved in an axial direction substantially parallel to a longitudinal axis of the torch handle. For example, the user interface switch 113 can move back and forth axially toward and away from a distal end of the torch. In some examples, the first position and the second position are color coded. For example, as depicted in FIGS. 4 and 5, an armed position (e.g., to enable the torch to fire by connecting the plasma control circuit and disconnecting the bypass circuit) can expose a first color (e.g., a "go" or "fire" color (e.g., green)) 113A and a disarmed position (e.g., to prevent the torch from firing by disconnecting the plasma control circuit and connecting the bypass circuit) can expose a second color (e.g., a "caution" or "stop" color (e.g., yellow or red)) 113B.

In some embodiments, as depicted in FIG. 5, the physical interface of the torch disable switch 112 includes a spring clip mechanism (e.g., a plastic or metallic clip) 115. The spring clip mechanism 115 can help to indicate to the user (e.g., in a tactile manner) whether the torch disable switch 112 is in one position or another to the user. For example, the spring clip mechanism can help provide a more clear on-off signal to the user and provide a tactile feedback. Additionally, in some cases, the spring clip mechanism can also help limit the torch disable switch 112 from inadvertently sliding between positions.

Additionally, in some embodiments, the torch disable switch 112 can selectively connect or disconnect a bypass circuit to bypass the cap sense switch 110. That is, the torch disable switch can be configured such that when it is moved into position, the cap sense switch 110 can be bypassed so that the consumables can be removed and replaced, which would otherwise trip the cap sense switch and cause an error in the system. The torch disable switch 112 is typically configured such that when bypassing the cap sense switch 110, it also disconnects the plasma control circuit to prevent the torch from accidently firing when consumables are being replaced, which can reduce incidences of injury. Thus, the torch disable switch can be configured to perform both actions at once. For example, the torch disable switch 112 can include a single pole, double throw switch configured to open the plasma control circuit before closing the bypass circuit.

Figure 3:
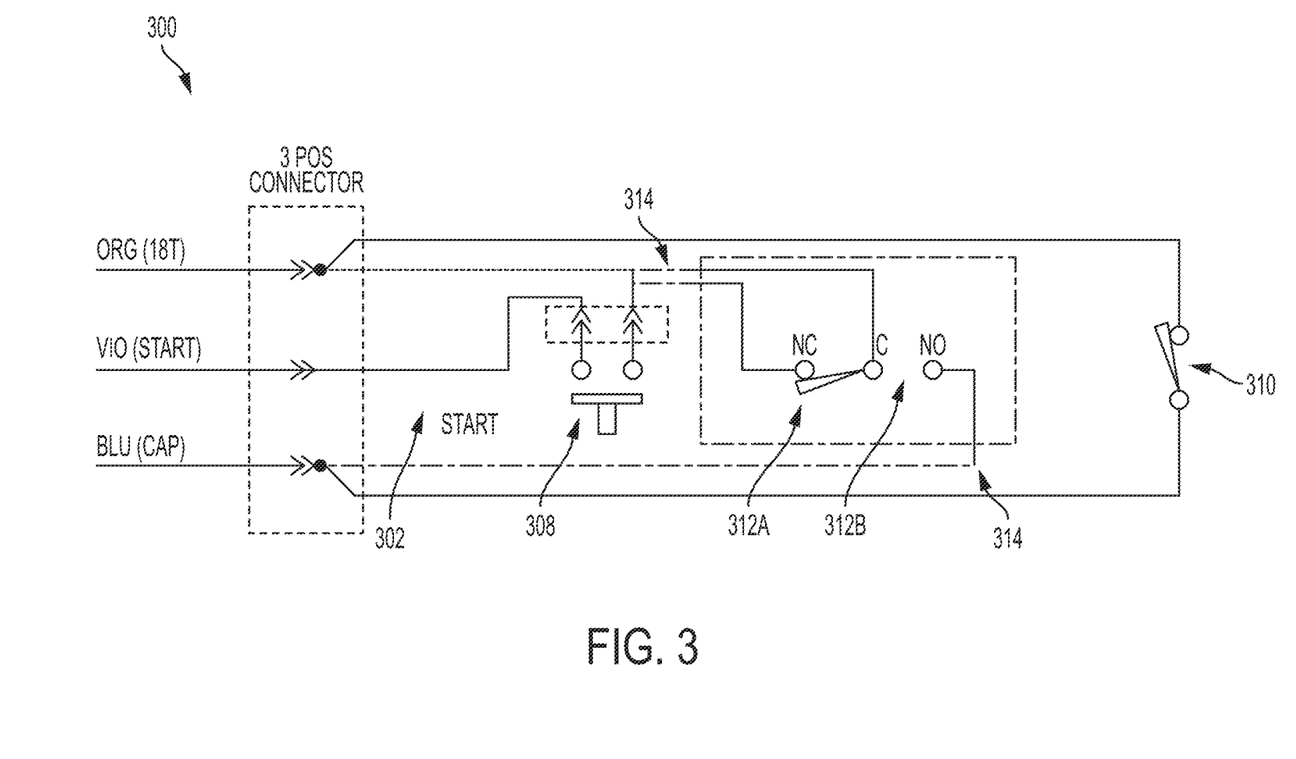
FIG. 3 is a circuit diagram illustrating an example plasma arc torch electrical circuit for controlling plasma current provided to consumables within a plasma arc torch.

Referring to FIG. 3, a safety circuit 300 for the plasma arc torch to regulate a supply of plasma current to the consumables in accordance with the systems and methods described herein can include the plasma start circuit 302 connected to provide a current from the plasma cutting system through the plasma arc torch to one or more consumables disposed in the plasma arc torch. The trigger 108 can be used to operate a switch 308 in the plasma start circuit 302 to connect or disconnect the start circuit for operation. In some examples, the trigger can be or include a switching means connected to the plasma control circuit and configured to generate a plasma arc from a tip of the torch.

The safety circuit 300 can include a cap sense switch circuit 310 configured to detect a presence of one or more of the consumables in the plasma arc torch. The cap sense switch circuit 310 can also be configured to connect or disconnect the plasma start circuit 302 in accordance with the detection of the presence of the one or more consumables, as discussed above. The safety circuit 300 can also include a cap sense bypass circuit 314 configured to provide a current in parallel to the cap sense switch 310. As discussed above, the cap sense bypass circuit 314 can be closed so that even if the cap sense switch is opened (e.g., when consumables are removed), the circuit can remain closed to prevent a system reset from being required.

The safety circuit can also include a means 312A to open the plasma start circuit 302 to limit current to the one or more consumables and, in some aspects, a means 312B to close the cap sense bypass circuit 314. The means 312A can be a means, separate from the switching means, to open the plasma start circuit to limit current flow, including pilot current, to the one or more consumables. For example, switches can be used to open and close the plasma start circuit 302 and the cap bypass circuit 314. In some embodiments, as discussed herein, the means 312A to open the plasma start circuit and the means 312B to close the cap sense bypass circuit comprise a common component. For example, the common component can include one torch disable switch 112 or user interface. The means to open the plasma start circuit can be separate from the switching means connected to the plasma control circuit and configured to generate a plasma arc from the tip of the torch.

As discussed above, in some examples, the plasma control circuit disconnect can be configured to selectively disconnect the plasma control circuit, and selectively connect the bypass circuit to bypass the cap sense switch based on a single operator input, such as a single input to the torch disable switch 112. In some cases, the plasma control circuit disconnect can be configured to selectively disconnect the plasma control circuit, and selectively connect the bypass circuit to bypass the cap sense switch substantially simultaneously.

In some embodiments, the locations and respective orientations of the trigger 108 and the torch disable switch 112 can be configured to further reduce or limit unintentional firing of the torch and related possible injuries resulting therefrom. For example, the trigger 108 and the torch disable switch 112 can be configured to move in different (e.g., substantially perpendicular) directions so that when the torch is handled, it is less likely that both switches will accidently be depressed at the same time, such as when a torch is slid into a user's pocket or dropped onto another surface.

While various aspects and examples have been described herein, typically using handheld torches, these are merely for illustrative purposes and other implementations, such as those included in or with mechanized plasma arc torch systems, are possible. For example, referring to FIG. 6, a mechanized torch (e.g., a torch to be mounted to and moved with a gantry (e.g., robotic or CNC system)) 200 can also include a torch disable switch 112, mounted in, on, or along a torch handle 102, to prevent current from flowing to the torch body 104 and consumables to that they can be safely handled (e.g., replaced). As discussed above with respect to the hand held torch examples, the torch disable switch 112 can include a user interface (e.g., a physical interface) 113 connected (e.g., mechanically or electrically connected) to the plasma control circuit disconnect to operatively connect or disconnect the plasma control circuit with the plasma control circuit disconnect in response to an operator input (e.g., sliding a switch). For example, in some embodiments, the torch disable switch 112 can include a physical switch 113 that can be manually activated by the user. While a mechanized torch is not typically manually handled by a user during use, in this context, the term torch grip (e.g., handle) 102 is used to refer to a body or frame of the torch that houses other components and mounts to the gantry for use. As discussed herein, in some embodiments, a torch operator interface 108 used to turn the torch on and off for use (e.g., to produce a plasma arc) can be located remote from the torch 200 itself, for example on a controller on a CNC machine. That is, in some embodiments, the torch disable switch 112 can be operated by the user on the torch itself. Additionally or alternatively, the torch disable switch 112 can be operated at the torch controller.

Unless otherwise stated herein, the various features or aspects of the example embodiments described herein can be combined or implemented in combination with one another. By way of example, unless otherwise stated, features of the torch disable switch described with respect to the handheld torch examples can be implemented or combined with the mechanized examples. Additionally, aspects of one type of torch disable switch (e.g., an electronic switch mounted on a circuit board embodiment) can be combined or implemented with another type of switch (e.g., a toggle or slide switch embodiment).

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A plasma arc torch for a plasma cutting system, the plasma arc torch comprising:
   a torch grip;
   an operator interface switch connected to a plasma control circuit: i) configured to control a current from the plasma cutting system through the plasma arc torch to one or more consumables disposed at a distal end of the torch grip and ii) configured to initiate generation of a plasma arc from a tip of the torch;
   a cap sense switch disposed within the torch grip connected to the plasma control circuit and configured to detect a presence of one or more of the consumables, the cap sense switch further configured to open or close the plasma control circuit in accordance with the detection of the presence of the one or more consumables; and
   a torch disable switch separate from the operator interface switch disposed on the torch grip and connected to the plasma control circuit, the torch disable switch including:
      a plasma control circuit disconnect configured to selectively connect or disconnect the plasma control circuit to prevent current flow, including pilot current, to the one or more consumables, and
      a user interface connected to the plasma control circuit disconnect, the user interface configured to operatively connect or disconnect the plasma control circuit with the plasma control circuit disconnect in response to an operator input.

2. The plasma arc torch of claim 1, wherein the plasma control circuit disconnect is further configured to selectively connect or disconnect a bypass circuit to bypass the cap sense switch.

3. The plasma arc torch of claim 2, wherein the plasma control circuit disconnect is configured to: i) selectively disconnect the plasma control circuit, and ii) selectively connect a bypass circuit to bypass the cap sense switch based on a single operator input.

4. The plasma arc torch of claim 3, wherein the plasma control circuit disconnect is configured to: i) selectively disconnect the plasma control circuit, and ii) selectively connect the bypass circuit to bypass the cap sense switch substantially simultaneously.

5. The plasma arc torch of claim 1, wherein the torch disable switch includes a spring clip mechanism.

6. The plasma arc torch of claim 1, wherein the plasma arc torch is an air-cooled plasma cutting system.

7. The plasma arc torch of claim 1, wherein the user interface is a slide mechanism having a first position and a second position.

8. The plasma arc torch of claim 7 wherein the first position and the second position are color coded indicators.

9. The plasma arc torch of claim 1, wherein the torch disable switch mechanically disconnects the plasma control circuit.

10. The plasma arc torch of claim 1, wherein the user interface is configured to be moved in an axial direction substantially parallel to a longitudinal axis of the torch grip.

11. The plasma arc torch of claim 1, wherein the operator interface switch is disposed remote from the torch.

12. The plasma arc torch of claim 1, wherein the operator interface switch is configured to be moved for engagement in a direction that is substantially a perpendicular direction to the user interface.

13. The plasma arc torch of claim 1, further comprising a printed circuit board disposed within the torch grip beneath, or integrated within, the torch disable switch.

14. A safety circuit for a plasma arc torch of a plasma cutting system to regulate a supply of plasma current, the circuit comprising:
   a plasma start circuit to provide a current flow for the plasma cutting system from the plasma arc torch to one or more consumables within the plasma arc torch;
   a switching means connected to a plasma control circuit, the switching means configured to generate a plasma arc from a tip of the plasma arc torch;
   a cap sense switch circuit configured to detect a presence of the one or more consumables for use in the plasma arc torch, the cap sense switch circuit further configured to connect or disconnect the plasma start circuit based on the detected presence of the one or more consumables; and
   a means, separate from the switching means, to open the plasma start circuit to limit the current flow to the one or more consumables.

15. The circuit of claim 14, further comprising: a cap sense bypass circuit configured to provide the current flow to the cap sense switch circuit; and a means to close the cap sense bypass circuit.

16. The circuit of claim 15, wherein the means to open the plasma start circuit and the means to close the cap sense bypass circuit comprise a common component.

17. The circuit of claim 15, wherein the means to open the plasma start circuit and the means to close the cap sense bypass circuit comprise a torch disable switch or a user interface.

18. A method of disengaging a plasma control circuit within a plasma arc torch of a plasma processing system to place the torch into a safety-locked mode, the method comprising:
provide:
    a plasma control circuit configured to convey a current from the plasma cutting system through the plasma arc torch to one or more consumables disposed in the torch grip;
    an operator interface switch connected to the plasma control circuit and configured to initiate generation of a plasma arc from the plasma arc torch; and
    a cap sense switch connected to the plasma control circuit and configured to: i) detect an installation of one or more of the consumables in the plasma arc torch, and ii) connect or disconnect the plasma control circuit in accordance with the detection of the installation of the one or more consumables; and
activating a switch, separate from the operator interface switch, disposed on the torch grip and connected to the plasma control circuit to disconnect the plasma control circuit to limit the current, including pilot current, from flowing to the one or more consumables.

19. The method of claim 18, wherein the activating a switch disposed on the torch grip further bypasses the cap sense switch by closing a circuit in parallel to the cap sense switch.

20. The method of claim 19, further comprising de-activating the switch to: connect the plasma control circuit and open the circuit to the cap sense switch to place the torch into a use mode; and activating a second switch to initiate a firing sequence to generate a plasma arc.

21. The method of claim 19, wherein the disconnecting the plasma control circuit and the bypassing the cap sense switch by closing the circuit in parallel to the cap sense switch are achieved in a single user input and the plasma control circuit is disconnected before bypassing the cap sense switch.

22. The method of claim 19, wherein the disconnecting the plasma control circuit and the bypassing the cap sense switch by closing the circuit in parallel to the cap sense switch are achieved in a single user input and the plasma control circuit is disconnected simultaneously with bypassing the cap sense switch.

23. The method of claim 18, further comprising removing and replacing a consumable from the plasma arc torch.

* * * * *